United States Patent

Clayton

[11] Patent Number: 5,861,814
[45] Date of Patent: Jan. 19, 1999

[54] TRAILER HITCH WITH SENSOR SYSTEM

[76] Inventor: Melvin Clayton, 2011 Wellington, Pine Bluff, Ark. 71603

[21] Appl. No.: 82,686

[22] Filed: May 21, 1998

[51] Int. Cl.$^6$ .................................................. G08B 21/00
[52] U.S. Cl. ........................ 340/687; 340/431; 340/691.6; 280/504
[58] Field of Search ................................... 340/431, 686, 340/687, 691.6, 693; 280/477, 504

[56] References Cited

U.S. PATENT DOCUMENTS

| | | | |
|---|---|---|---|
| 4,187,494 | 2/1980 | Jessee | 340/686 |
| 4,852,901 | 8/1989 | Beasley et al. | 280/477 |
| 4,988,116 | 1/1991 | Evertsen | 340/687 |
| 5,108,123 | 4/1992 | Rubenzik | 340/101 |
| 5,159,312 | 10/1992 | Engle | 340/431 |
| 5,513,870 | 5/1996 | Hickman | 340/431 |
| 5,650,764 | 7/1997 | McCullough | 340/431 |
| 5,669,621 | 9/1997 | Lockwood | 280/477 |
| 5,729,194 | 3/1998 | Spears et al. | 340/431 |

*Primary Examiner*—Daniel J. Wu

[57] ABSTRACT

A new trailer hitch with sensor system for allowing for easier alignment for coupling with a trailer. The inventive device includes a hitch portion secured to a rear portion of a towing vehicle. The hitch portion has an upper ball portion. The upper ball portion has a pair of sensors disposed therein. Each of the sensors are connected to a central wire. The central wire extends interiorly of the vehicle. A trailer tongue extends outwardly from a trailer. The trailer tongue has a ball socket formed within a free end thereof. The ball socket is dimensioned for receiving the upper ball portion of the hitch portion therein. The ball socket has a magnet disposed therein for being sensed by the sensors of the upper ball portion. A display box is positioned interiorly of the vehicle. The display box is in communication with the central wire of the pair of sensors. The display box provides signals related to a proximity of the trailer tongue to the hitch portion.

14 Claims, 2 Drawing Sheets

TRAILER HITCH WITH SENSOR SYSTEM

BACKGROUND OF THE INVENTION

1. Field of the Invention

The present invention relates to trailer alignment devices and more particularly pertains to a new trailer hitch with sensor system for allowing for easier alignment for coupling with a trailer.

2. Description of the Prior Art

The use of trailer alignment devices is known in the prior art. More specifically, trailer alignment devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art trailer alignment devices include U.S. Pat. No. 5,108,123 to Rubenzik; U.S. Pat. No. 5,650,764 to McCullough; U.S. Pat. No. 4,852,901 to Beasely et al.; U.S. Pat. No. 4,187,494 to Jessee; and U.S. Pat. No. 3,159,917 to Whitehead.

While these devices fulfill their respective, particular objectives and requirements, the aforementioned patents do not disclose a new trailer hitch with sensor system. The inventive device includes a hitch portion secured to a rear portion of a towing vehicle. The hitch portion has an upper ball portion. The upper ball portion has a pair of sensors disposed therein. Each of the sensors are connected to a central wire. The central wire extends interiorly of the vehicle. A trailer tongue extends outwardly from a trailer. The trailer tongue has a ball socket formed within a free end thereof. The ball socket is dimensioned for receiving the upper ball portion of the hitch portion therein. The ball socket has a magnet disposed therein for being sensed by the sensors of the upper ball portion. A display box is positioned interiorly of the vehicle. The display box is in communication with the central wire of the pair of sensors. The display box provides signals related to a proximity of the trailer tongue to the hitch portion.

In these respects, the trailer hitch with sensor system according to the present invention substantially departs from the conventional concepts and designs of the prior art, and in so doing provides an apparatus primarily developed for the purpose of allowing for easier alignment for coupling with a trailer.

SUMMARY OF THE INVENTION

In view of the foregoing disadvantages inherent in the known types of trailer alignment devices now present in the prior art, the present invention provides a new trailer hitch with sensor system construction wherein the same can be utilized for allowing for easier alignment for coupling with a trailer.

The general purpose of the present invention, which will be described subsequently in greater detail, is to provide a new trailer hitch with sensor system apparatus and method which has many of the advantages of the trailer alignment devices mentioned heretofore and many novel features that result in a new trailer hitch with sensor system which is not anticipated, rendered obvious, suggested, or even implied by any of the prior art trailer alignment devices, either alone or in any combination thereof.

To attain this, the present invention generally comprises a hitch portion secured to a rear portion of a towing vehicle. The hitch portion has an upper ball portion. The upper ball portion has a pair of sensors disposed therein. Each of the sensors is connected to a central wire. The central wire extends interiorly of the vehicle. A trailer tongue extends outwardly from a trailer. The trailer tongue has a ball socket formed within a free end thereof. The ball socket is dimensioned for receiving the upper ball portion of the hitch portion therein. The ball socket has a magnet disposed therein for being sensed by the sensors of the upper ball portion. The trailer tongue has a stop plate extending downwardly therefrom inwardly of the ball socket. A display box is positioned interiorly of the vehicle. The display box is in communication with the central wire of the pair of sensors. The display box has a flexible band on a rear surface thereof to facilitate securement to a sun visor of the vehicle. The display box has audio and light components therein with corresponding speakers and visual lights on an exterior thereof. The visual lights have a center light and a plurality of left lights and a plurality of right lights. The display box has a power switch. The display box provides signals related to a proximity of the trailer tongue to the hitch portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new trailer hitch with sensor system apparatus and method which has many of the advantages of the trailer alignment devices mentioned heretofore and many novel features that result in a new trailer hitch with sensor system which is not anticipated, rendered obvious, suggested, or even implied by any of the prior art trailer alignment devices, either alone or in any combination thereof.

It is another object of the present invention to provide a new trailer hitch with sensor system which may be easily and efficiently manufactured and marketed.

It is a further object of the present invention to provide a new trailer hitch with sensor system which is of a durable and reliable construction.

An even further object of the present invention is to provide a new trailer hitch with sensor system which is susceptible of a low cost of manufacture with regard to both materials and labor, and which accordingly is then susceptible of low prices of sale to the consuming public, thereby making such trailer hitch with sensor system economically available to the buying public.

Still yet another object of the present invention is to provide a new trailer hitch with sensor system which provides in the apparatuses and methods of the prior art some of the advantages thereof, while simultaneously overcoming some of the disadvantages normally associated therewith.

Still another object of the present invention is to provide a new trailer hitch with sensor system for allowing for easier alignment for coupling with a trailer.

Yet another object of the present invention is to provide a new trailer hitch with sensor system which includes a hitch portion secured to a rear portion of a towing vehicle. The hitch portion has an upper ball portion. The upper ball portion has a pair of sensors disposed therein. Each of the sensors are connected to a central wire. The central wire extends interiorly of the vehicle. A trailer tongue extends outwardly from a trailer. The trailer tongue has a ball socket formed within a free end thereof. The ball socket is dimensioned for receiving the upper ball portion of the hitch portion therein. The ball socket has a magnet disposed therein for being sensed by the sensors of the upper ball portion. A display box is positioned interiorly of the vehicle. The display box is in communication with the central wire of the pair of sensors. The display box provides signals related to a proximity of the trailer tongue to the hitch portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
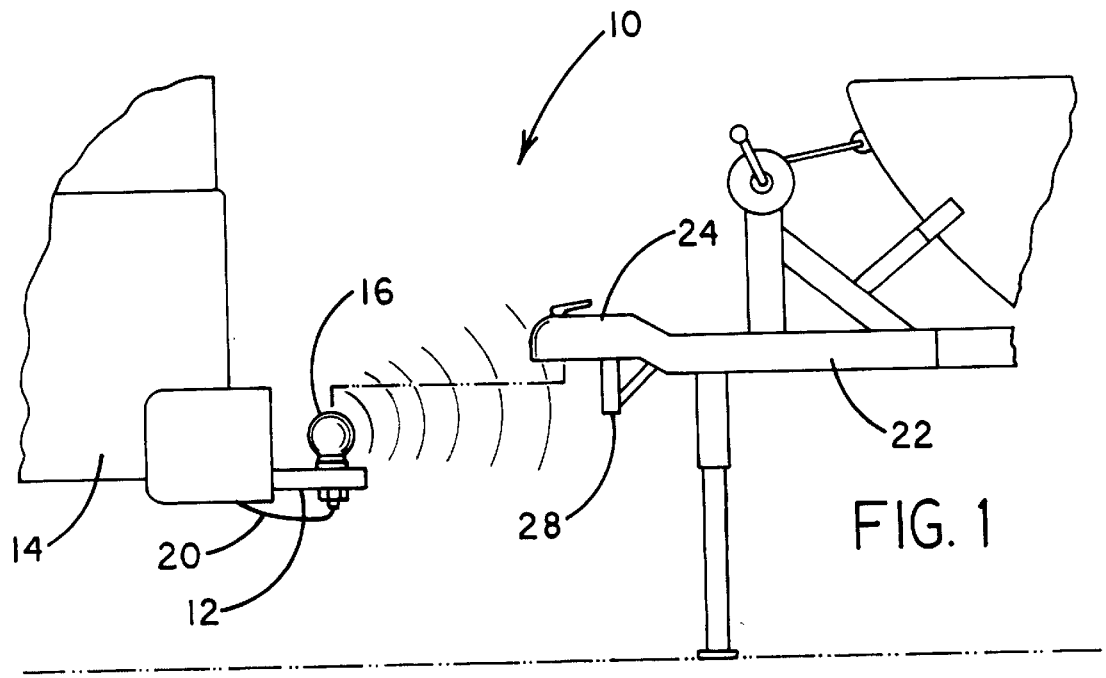
FIG. 1 is a side view of a new trailer hitch with sensor system according to the present invention.
Figure 2:
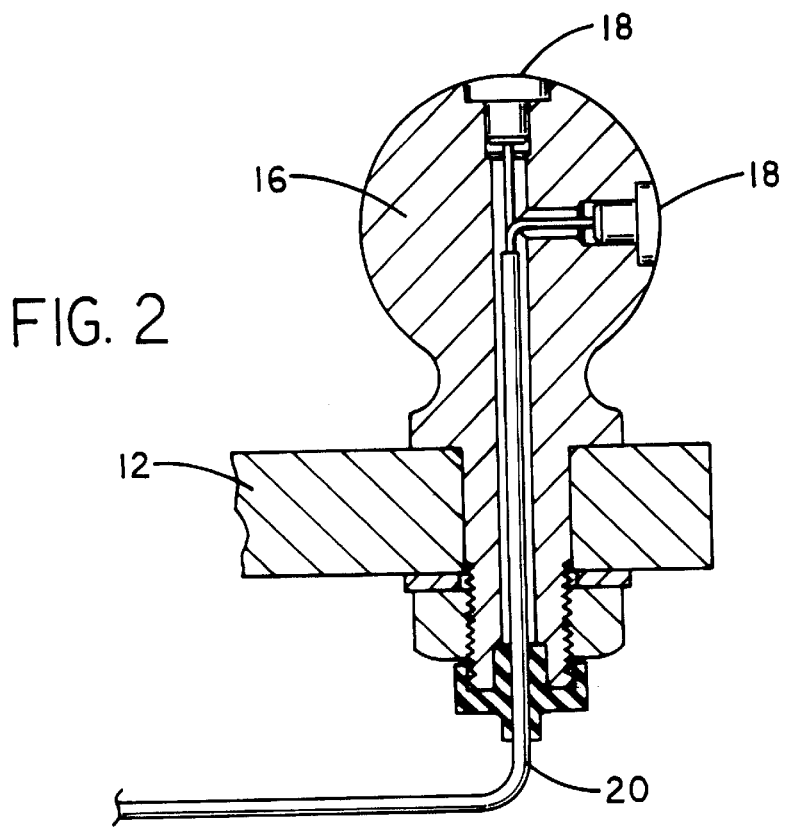
FIG. 2 is a cross-sectional view of the hitch of the present invention.
Figure 3:
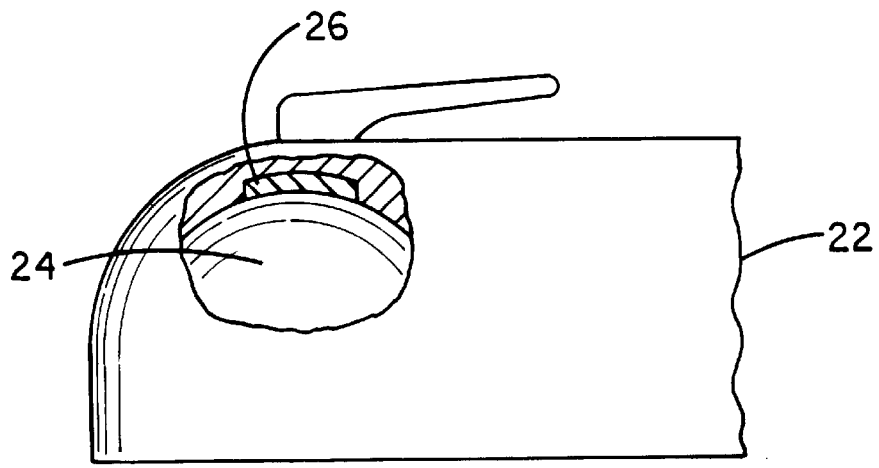
FIG. 3 is a side view of the trailer tongue of the present invention.
Figure 4:
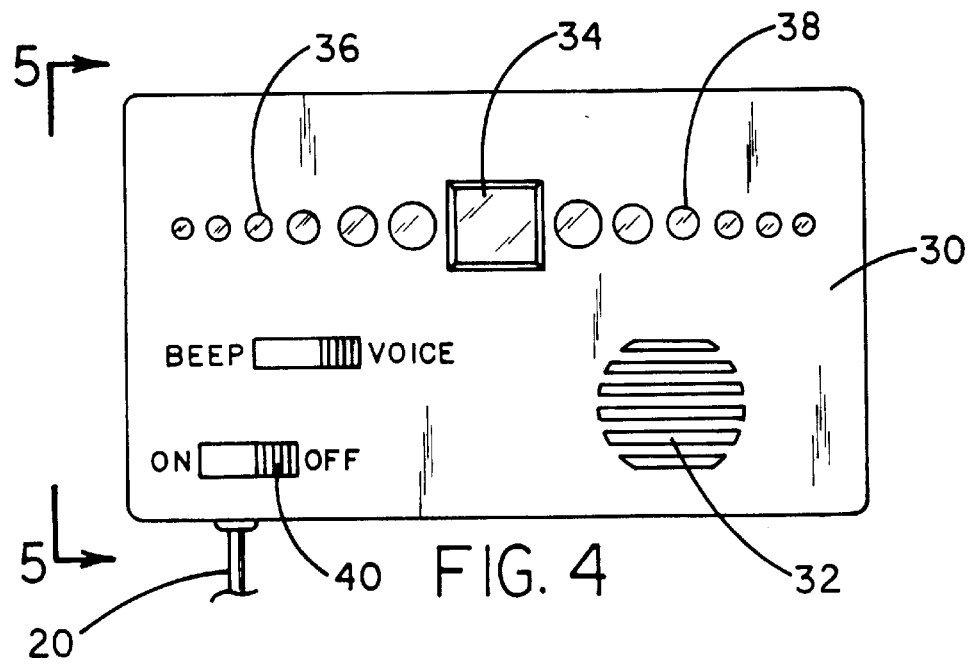
FIG. 4 is a front view of the display box of the present invention.
Figure 5:
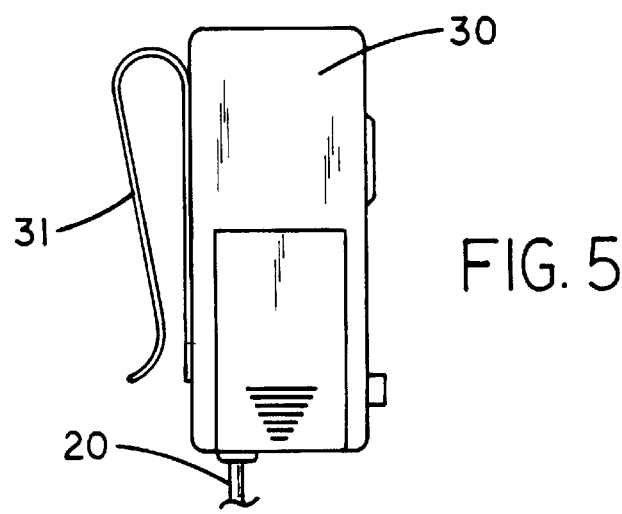
FIG. 5 is a side view of the present invention as taken along line 5—5 of FIG. 4.

With reference now to the drawings, and in particular to FIGS. 1 through 5 thereof, a new trailer hitch with sensor system embodying the principles and concepts of the present invention and generally designated by the reference numeral 10 will be described.

As best illustrated in FIGS. 1 through 5, the trailer hitch with sensor system 10 comprises a hitch portion 12 secured to a rear portion of a towing vehicle 14. The hitch portion 12 has an upper ball portion 16. The upper ball portion 16 has a pair of sensors 18 disposed therein. Each of the sensors 18 is connected to a central wire 20. The central wire 20 extends interiorly of the vehicle 14.

A trailer tongue 22 extends outwardly from a trailer. The trailer tongue 22 has a ball socket 24 formed within a free end thereof. The ball socket 24 is dimensioned for receiving the upper ball portion 16 of the hitch portion 12 therein. The ball socket 24 has a magnet 26 disposed therein for being sensed by the sensors 18 of the upper ball portion 16. The trailer tongue 22 has a stop plate 28 extending downwardly therefrom inwardly of the ball socket 24. The stop plate 28 is positioned to make contact with the hitch portion 12 to allow for perfect alignment. Optionally, the stop plate 28 can pivot upwardly when not in use.

A display box 30 is positioned interiorly of the vehicle 14. The display box 30 is in communication with the central wire 20 of the pair of sensors 18. The display box 30 has a flexible band 31 on a rear surface thereof to facilitate securement to a sun visor of the vehicle 14. The display box 30 has audio and light components therein with corresponding speakers 32 and visual lights on an exterior thereof. The visual lights have a center light 34 and a plurality of left lights 36 and a plurality of right lights 38. The display box 30 has a power switch 40. The display box 30 provides signals related to a proximity of the trailer tongue 22 to the hitch portion 12.

In use, the present invention is based on a simple magnetic sensing system. Both the sensors 18 on the hitch portion 12 and display box 30 would derive the small amount of power needed to operate them from the 12-volt electrical system of the vehicle 14. The display box 30 would essentially guide the driver in backing up the vehicle 14 to the trailer. This system would operate as follows: when the driver began backing up, the lights on the display box 30 would show whether the magnet 26 on the ball socket 24 was located to the left or right of the sensors 18, helping him to adjust his course. When he was relatively far from the trailer, small lights would illuminate, but as he got closer and closer, larger, brighter lights would be activated. When he was on the correct course to the trailer, the central light 34 would illuminate. While the driver was backing up, the display box 30 would also emit a beeping sound which would become either quicker or louder as the hitch portion 12 got closer to the trailer tongue 22. Finally, when the hitch portion 12 was perfectly aligned with the trailer tongue 22, the beeping sound would change to a car horn sound, letting the driver know that he could stop because the vehicle 14 and trailer were perfectly aligned and ready to be connected. Alternately, the beeping sound could be replaced by a voice. The voice would tell the driver while backing the vehicle 14 toward the trailer to make the necessary adjustments, such as more right, more left and the like. A switch can be used on the display box 30 to allow the driver to select from the beeping sounds or the voice as his choice for guidance.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A new trailer hitch with sensor system for allowing for easier alignment for coupling with a trailer comprising, in combination:

a hitch portion secured to a rear portion of a towing vehicle, the hitch portion having an upper ball portion, the upper ball portion having first and second sensors disposed therein, each of the sensors being connected to a central wire, the central wire extending interiorly of the vehicle;

wherein the hitch portion has a top end, a bottom end and a longitudinal axis being extended between the top and bottom ends, the first sensor being positioned on the longitudinal axis towards the top end of the upper ball portion of the hitch portion, the second sensor being positioned towards a back end of the upper ball portion of the hitch portion at about a 90 degree angle from the first sensor;

a trailer tongue extending outwardly from a trailer, the trailer tongue having a ball socket formed within a free end thereof, the ball socket being dimensioned for receiving the upper ball portion of the hitch portion therein, the ball socket having a magnet disposed therein for being sensed by the sensors of the upper ball portion, the magnet being positioned towards an uppermost portion of an inner surface of the ball socket such that the magnet is positioned directly above the first sensor when the hitch portion is aligned directly under the ball socket, the trailer tongue having a stop plate extending downwardly therefrom inwardly of the ball socket, the stop plate being upwardly pivotable;

a display box positioned interiorly of the vehicle, the display box being in communication with the central wire of the pair of sensors, the display box having a flexible band on a rear surface thereof to facilitate securement to a sun visor of the vehicle, the display box having audio and light components therein with corresponding speakers and visual lights on an exterior thereof, the visual lights having a center light and a plurality of left lights and a plurality of right lights, the display box having a power switch, the display box providing signals related to a proximity of the trailer tongue to the hitch portion;

the left lights being generally circular and extending in a row between a left end of the display box and the center light, the row of left lights having a proximal light and a distal light, the proximal light being positioned adjacent the center light, wherein the diameter of the left lights consecutively increases from the distal light to the proximal light, wherein the intensity of the left lights consecutively increases from the distal light to the proximal light, wherein the distal light emits light when the ball socket of the trailer tongue is positioned to the left of the hitch portion, the lights consecutively lighting up from the distal light towards the proximal light as the hitch portion moves towards the ball socket of the trailer tongue;

the right lights being generally circular and extending in a row between a right end of the display box and the center light, the row of right lights having a proximal light and a distal light, the proximal light being positioned adjacent the center light, wherein the diameter of the right lights consecutively increases from the distal light to the proximal light, wherein the intensity of the right lights consecutively increases from the distal light to the proximal light wherein the distal light emits light when the ball socket of the trailer tongue is positioned to the right of the hitch portion, the lights consecutively lighting up from the distal light towards the proximal light as the hitch portion moves towards the ball socket of the trailer tongue;

wherein the center light is lighted when the hitch portion is moving directly towards the ball socket of the trailer tongue;

wherein the display box emits a voice instructing a driver of the towing vehicle to turn the towing vehicle in order to line up the hitch portion with the ball socket of the trailer tongue;

wherein the display box emits a beeping sound at spaced apart intervals, the intervals becoming shorter as the hitch portion moves towards the ball socket of the trailer tongue;

the display box having a switch permitting selection of the voice or the beeping sound; and wherein the display box emits a car horn sound when the hitch portion is aligned directly under the ball socket of the trailer tongue.

2. A new trailer hitch with sensor system for allowing for easier alignment for coupling with a trailer comprising, in combination:

a hitch portion secured to a rear portion of a towing vehicle, the hitch portion having an upper ball portion, the upper ball portion having a pair of sensors disposed therein, each of the sensors being connected to a central wire, the central wire extending interiorly of the vehicle;

a trailer tongue extending outwardly from a trailer, the trailer tongue having a ball socket formed within a free end thereof, the ball socket being dimensioned for receiving the upper ball portion of the hitch portion therein, the ball socket having a magnet disposed therein for being sensed by the sensors of the upper ball portion;

a display box positioned interiorly of the vehicle, the display box being in communication with the central wire of the pair of sensors, the display box having light components therein with corresponding visual lights on an exterior thereof, the visual lights having a plurality of left lights and a plurality of right lights, the display box providing signals related to a proximity of the trailer tongue to the hitch portion;

the left lights extending in a row from a left end of the display box towards a center of the display box, the row of left lights having a proximal light and a distal light, the proximal light being positioned towards a center of the display box, the lights consecutively lighting up from the distal light towards the proximal light as the hitch portion moves towards the ball socket of the trailer tongue; and the right lights extending in a row between a right end of the display box and the center light, the row of right lights having a proximal light and a distal light the proximal light being positioned adjacent the center light the lights consecutively lighting up from the distal light towards the proximal light as the hitch portion moves towards the ball socket of the trailer tongue.

3. The trailer hitch with sensor system as set forth in claim 2 wherein the display box has a flexible band on a rear surface thereof to facilitate securement to a sun visor of the vehicle.

4. The trailer hitch with sensor system as set forth in claim 2 wherein the visual lights have a center light being positioned between the plurality of left lights and the plurality of right lights, the center light being lighted when the hitch portion is moving directly towards the ball socket of the trailer tongue.

5. The trailer hitch with sensor system as set forth in claim 2 wherein the diameter of the left lights consecutively increases from the distal light to the proximal light, the distal light of the left lights emitting light when the ball socket of the trailer tongue is positioned to the left of the hitch portion, the distal light of the right lights emitting light when the ball socket of the trailer tongue is positioned to the right of the hitch portion.

6. The trailer hitch with sensor system as set forth in claim 2 wherein wherein the intensity of the left lights consecutively increases from the distal light to the proximal light, wherein the distal light emits light when the ball socket of the trailer tongue is positioned to the left of the hitch portion, the distal light of the right lights emitting light when the ball socket of the trailer tongue is positioned to the right of the hitch portion.

7. The trailer hitch with sensor system as set forth in claim 2 wherein the display box has audio components therein with corresponding speakers on an exterior thereof, the display box emitting a beeping sound at spaced apart intervals, the intervals becoming shorter as the hitch portion moves towards the ball socket of the trailer tongue.

8. The trailer hitch with sensor system as set forth in claim 2 wherein the display box emits a car horn sound when the hitch portion is aligned directly under the ball socket of the trailer tongue.

9. The trailer hitch with sensor system as set forth in claim 2 wherein the trailer tongue has a stop plate extending downwardly therefrom inwardly of the ball socket.

10. The trailer hitch with sensor system as set forth in claim 9 wherein the stop plate is upwardly pivotable.

11. The trailer hitch with sensor system as set forth in claim 2 wherein the display box has audio components therein with corresponding speakers on an exterior thereof, wherein the display box emits a voice instructing a driver of the towing vehicle to turn the towing vehicle in order to line up the hitch portion with the ball socket of the trailer tongue.

12. The trailer hitch with sensor system as set forth in claim 11 wherein the display box has a switch permitting selection of the voice or a beeping sound.

13. The trailer hitch with sensor system as set forth in claim 2 wherein the hitch portion has a top end, a bottom end, and a longitudinal axis being extended between the top and bottom ends, the first sensor being positioned on the longitudinal axis towards the top end of the upper ball portion of the hitch portion, the second sensor being positioned towards a back end of the upper ball portion of the hitch portion at about a 90 degree angle from the first sensor.

14. The trailer hitch with sensor system as set forth in claim 13 wherein the magnet of the ball socket is positioned towards an uppermost portion of an inner surface of the ball socket such that the magnet is positioned directly above the first sensor when the hitch portion is aligned directly under the ball socket.

\* \* \* \* \*